US012803135B2

(12) United States Patent
Shin et al.

(10) Patent No.: US 12,803,135 B2
(45) Date of Patent: Nov. 17, 2026

(54) BATTERY PACK AND ENERGY STORAGE SYSTEM INCLUDING THE SAME

(71) Applicant: LG ENERGY SOLUTION, LTD., Seoul (KR)

(72) Inventors: Jong-Chan Shin, Daejeon (KR); Ki-Youn Kim, Daejeon (KR); Jung-Il Park, Daejeon (KR); Young-Bo Cho, Daejeon (KR); Byung-Hyuk Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 550 days.

(21) Appl. No.: 18/283,187

(22) PCT Filed: Dec. 19, 2022

(86) PCT No.: PCT/KR2022/020741
§ 371 (c)(1),
(2) Date: Sep. 20, 2023

(87) PCT Pub. No.: WO2023/121189
PCT Pub. Date: Jun. 29, 2023

(65) Prior Publication Data

US 2024/0170821 A1 May 23, 2024

(30) Foreign Application Priority Data

Dec. 21, 2021 (KR) ........................ 10-2021-0184402

(51) Int. Cl.

| | |
|---|---|
| ***H01M 50/591*** | (2021.01) |
| ***H01R 13/447*** | (2006.01) |
| ***H02J 7/70*** | (2026.01) |

(52) U.S. Cl.
CPC ........ *H01M 50/591* (2021.01); *H01R 13/447* (2013.01); *H02J 7/70* (2026.01); *H02J 2207/20* (2020.01)

(58) Field of Classification Search
None
See application file for complete search history.

(56) References Cited

U.S. PATENT DOCUMENTS

2008/0096404 A1 4/2008 Caggiano
2012/0007446 A1 1/2012 Ro
2012/0062180 A1 3/2012 Nakamura et al.
(Continued)

FOREIGN PATENT DOCUMENTS

CN 201805062 U 4/2011
CN 107809025 A * 3/2018 ........... H01R 13/465
(Continued)

OTHER PUBLICATIONS

Abstract Translation of CN 107809025 A (Year: 2018).*
(Continued)

*Primary Examiner* — Kevin M Bernatz
(74) *Attorney, Agent, or Firm* — Birch, Stewart, Kolasch & Birch, LLP

(57) ABSTRACT

A battery pack includes a battery module having at least one battery cell, a pack case configured to accommodate the battery module, and a connection guide unit provided on at least one side of the pack case and configured to be accessible to electrical members of two or more connection types.

7 Claims, 14 Drawing Sheets

(56) References Cited

U.S. PATENT DOCUMENTS

| | | | |
|---|---|---|---|
| 2015/0171542 | A1 | 6/2015 | Pietila et al. |
| 2015/0194839 | A1 | 7/2015 | Wojcik et al. |
| 2015/0288185 | A1 | 10/2015 | Ellerkamp et al. |
| 2018/0086217 | A1* | 3/2018 | Scherdin ................. B60L 53/16 |
| 2018/0337501 | A1 | 11/2018 | Cai et al. |
| 2021/0039506 | A1 | 2/2021 | Lee et al. |
| 2021/0126475 | A1* | 4/2021 | Preisig ...................... H02J 7/70 |

FOREIGN PATENT DOCUMENTS

| | | | |
|---|---|---|---|
| CN | 111162596 | A | 5/2020 |
| CN | 210576063 | U | 5/2020 |
| JP | 2009-131089 | A | 6/2009 |
| JP | 2009-131090 | A | 6/2009 |
| JP | 2011-87392 | A | 4/2011 |
| JP | 2012-64353 | A | 3/2012 |
| JP | 2013-154839 | A | 8/2013 |
| JP | 2016-506710 | A | 3/2016 |
| JP | 2020-184875 | A | 11/2020 |
| JP | 6857664 | B2 | 4/2021 |
| KR | 20-2011-0008437 | U | 8/2011 |
| KR | 10-1243480 | B1 | 3/2013 |
| KR | 10-2016-0082075 | A | 7/2016 |
| KR | 10-1641667 | B1 | 7/2016 |
| KR | 10-2016-0095536 | A | 8/2016 |
| KR | 10-2021-0018598 | A | 2/2021 |

OTHER PUBLICATIONS

International Search Report for PCT/KR2022/020741 (PCT/ISA/210) mailed on Mar. 23, 2023.

Extended European Search Report for European Application No. 22911822.9, dated Nov. 25, 2024.

* cited by examiner

BATTERY PACK AND ENERGY STORAGE SYSTEM INCLUDING THE SAME

TECHNICAL FIELD

The present disclosure relates to a battery pack and an energy storage system including the same, and more particularly, to a battery pack with increased convenience of installation work and an energy storage system including the same.

The present application claims priority to Korean Patent Application No. 10-2021-0184402 filed on Dec. 21, 2021 in the Republic of Korea, the disclosures of which are incorporated herein by reference.

BACKGROUND ART

Currently commercialized secondary batteries include nickel cadmium batteries, nickel hydrogen batteries, nickel zinc batteries, and lithium secondary batteries. Among them, lithium secondary batteries are in the limelight due to their advantages of free charge and discharge, very low self-discharge rate, and high energy density, as the memory effect hardly occurs, compared to nickel-based secondary batteries.

These lithium secondary batteries mainly use lithium-based oxide and carbon material as positive electrode active material and negative electrode active material, respectively. A lithium secondary battery includes an electrode assembly in which a positive electrode plate and a negative electrode plate coated with such a positive electrode active material and a negative electrode active material, respectively, are disposed with a separator therebetween, and an exterior material, namely a battery case, for sealing and housing the electrode assembly together with the electrolyte.

In general, lithium secondary batteries can be classified into a can-type secondary battery in which an electrode assembly is embedded in a metal can and a pouch-type secondary battery in which an electrode assembly is embedded in a pouch of an aluminum laminate sheet, depending on the shape of the exterior material.

These secondary batteries are widely used not only in small devices such as portable electronic devices, but also in medium and large devices such as electric vehicles and energy storage systems (ESSs), and their use is rapidly increasing. In addition, recently, as issues such as power shortage or eco-friendly energy have emerged, an energy storage system (ESS) for storing generated power has received a lot of attention. Typically, when such an energy storage system is used, it is easy to construct a power management system such as a smart grid system, so that power supply and demand can be easily controlled in a specific region or city. In addition, as commercialization of electric vehicles is in full swing, such an energy storage system can be applied to electric charging stations capable of charging electric vehicles.

Moreover, in recent years, in order to store and supply electric power for use in buildings such as houses or commercial buildings, residential energy storage systems have been widely used. In addition, the core component of such a residential energy storage system can be a battery pack.

In various battery packs such as battery packs used in such residential ESSs, a plurality of battery cells (secondary batteries) are included to increase capacity and/or output. In particular, in order to increase the energy density of the battery pack, a large number of battery cells are often arranged in a dense state within a very narrow space.

In the case of a conventional battery pack, depending on the country or region of installation, the installation method is different when connecting the battery pack and electrical members such as inverters, so additional or dedicated parts are required for compatibility or the like during product installation or subsequent management even though the same product is used.

Accordingly, the need for a battery pack that can be connected compatible with electrical members of various connection types is increasing.

Therefore, it is required to find a way to provide a battery pack that can increase installation compatibility and improve installation workability, and an energy storage system including the same.

DISCLOSURE

Technical Problem

The present disclosure is designed to solve the problems of the related art, and therefore the present disclosure is directed to providing a battery pack that may increase the installation compatibility, and an energy storage system including the same.

In addition, the present disclosure is directed to providing a battery pack that may increase the installation workability, and an energy storage system including the same.

However, the technical problem to be solved by the present disclosure is not limited to the above-mentioned problem, and other problems not mentioned will be clearly understood by those skilled in the art from the present disclosure described below.

Technical Solution

In one aspect of the present disclosure, there is provided a battery pack comprising: a battery module having at least one battery cell; a pack case configured to accommodate the battery module; and a connection guide provided on at least one side of the pack case and configured to be accessible to electrical members of two or more connection types.

Also, preferably, the connection guide may include a first connection guider provided to be accessible to an electrical member of a first connection type; and a second connection guider provided to be accessible to an electrical member of a second connection type that is different from the electrical member of the first connection type.

Also, preferably, the first connection guider and the second connection guider may be provided on different sides of the pack case.

Also, preferably, the first connection guider may be provided on a first side surface of the pack case, and the second connection guider may be provided on a second side surface of the pack case adjacent to the first side surface of the pack case.

Also, preferably, at least one of the first connection guider and the second connection guider may be exposed to be accessible to an outside of the pack case according to a user operation.

Also, preferably, the connection guide may include a shaft portion rotatably provided in the pack case and connected to the first connection guider and the second connection guider.

Also, preferably, the first connection guider may be provided on a first side of the shaft portion, and the second connection guider may be provided on a second side of the shaft portion.

Also, preferably, the shaft portion may rotate according to the user operation to expose the first connection guider or the second connection guider to the outside of the pack case.

Also, preferably, the shaft portion may be mounted to the pack case to be rotatable in any one of clockwise and counterclockwise directions.

Also, preferably, the battery pack may further comprise a fixing stopper provided to the pack case to fix the shaft portion.

Also, preferably, the fixing stopper may be coupled to the shaft portion or separated from the shaft portion by sliding according to the user operation.

Also, preferably, the connection guide unit may include a slider slidably provided in the pack case and configured to expose any one of the first connection guider and the second connection guider to the outside of the pack case through the sliding.

Also, preferably, the slider may be configured to be slidable between a first position capable of exposing the first connection guider and a second position capable of exposing the second connection guider.

Also, preferably, the connection guide unit may be configured to guide the connection between the battery pack and an inverter.

In addition, the present disclosure provides an energy storage system comprising the battery pack according to the above embodiments.

A fixing stopper may be provided to the pack case to prevent rotation of the shaft portion.

The slider may cover the second connection guider when the first connection guider is exposed.

Advantageous Effects

According to various embodiments as described above, there may be provided a battery pack that may increase the installation compatibility, and an energy storage system including the same.

In addition, according to various embodiments as described above, there may be provided a battery pack that may increase the installation workability, and an energy storage system including the same.

In addition, various additional effects can be achieved by various embodiments of the present disclosure. Various effects of the present disclosure will be described in detail in each embodiment, or descriptions of effects that can be easily understood by those skilled in the art will be omitted.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure.

Meanwhile, in the present specification, terms indicating directions such as up, down, left, right, front, and back may be used, but these terms are only for convenience of description, and it is obvious to those skilled in the art that they may vary depending on the location of the target object or the location of the observer.

Terms such as first, second, and the like may be used in the following description. These terms are only used to distinguish any component from other components, and the nature, sequence, or order of the corresponding component is not limited by the term.

Figure 1:
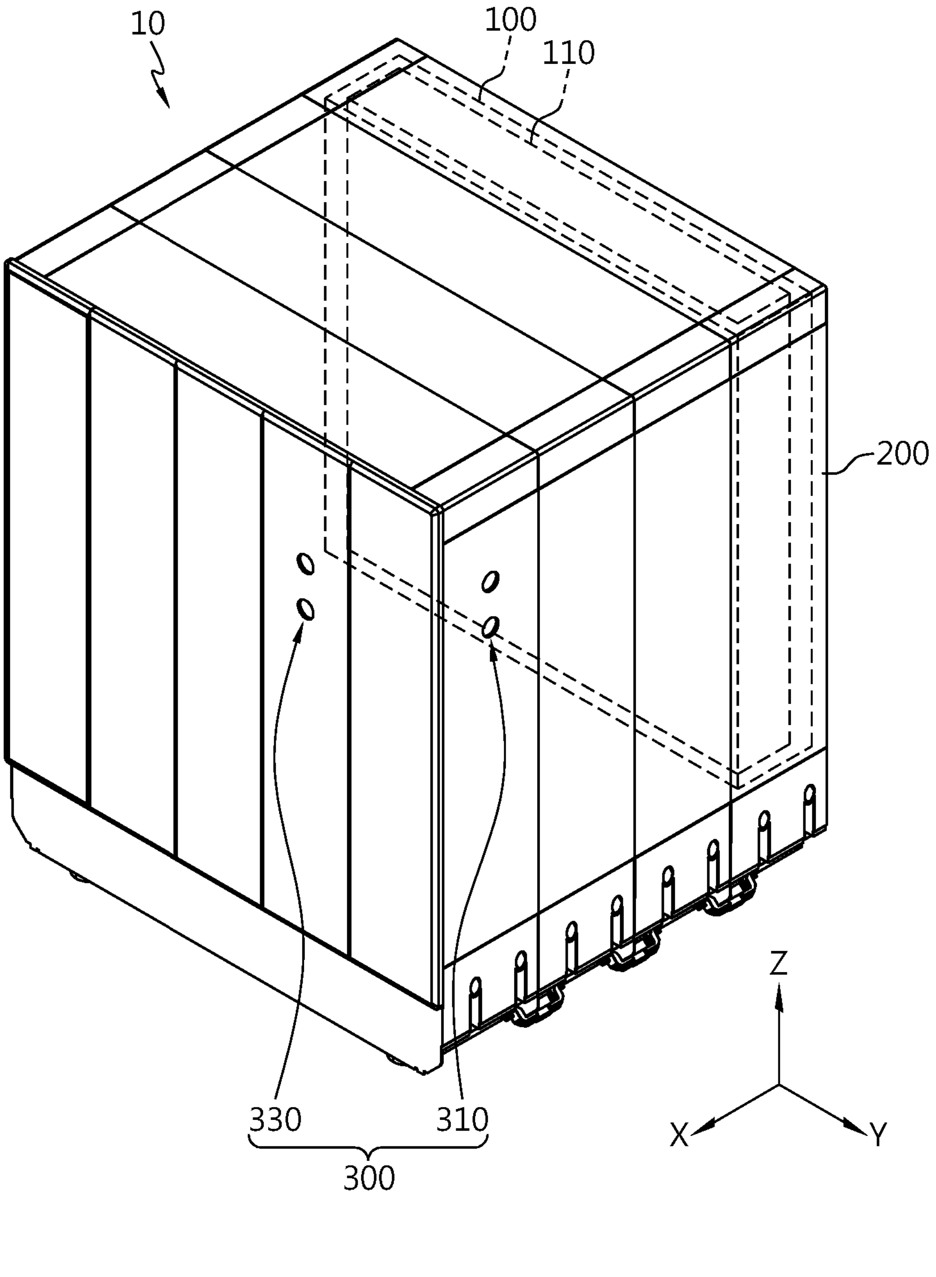
FIG. 1 is a diagram for explaining a battery pack according to an embodiment of the present disclosure.
Figure 2:
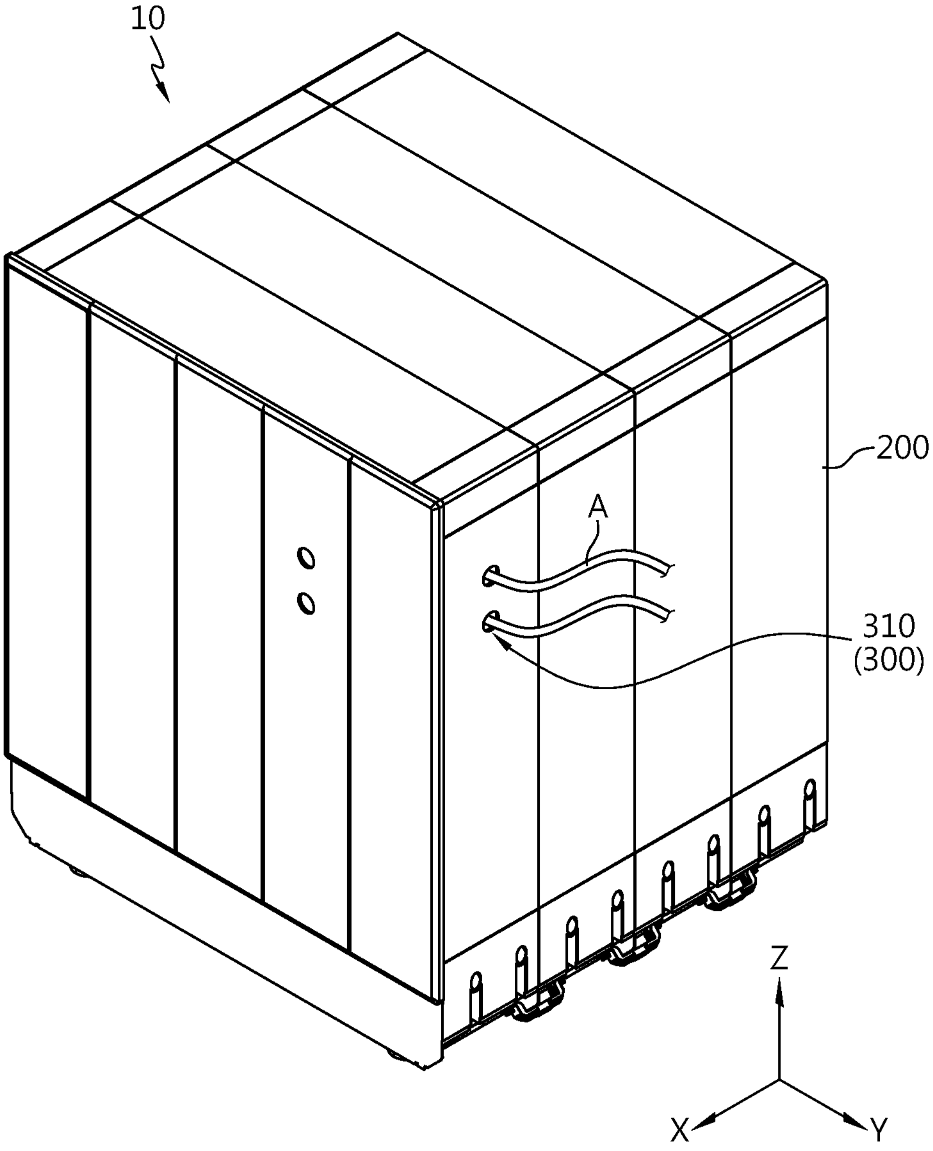
FIG. 2 is a diagram for explaining the connection between the battery pack of FIG. 1 and an electrical member of a first connection type.
Figure 3:
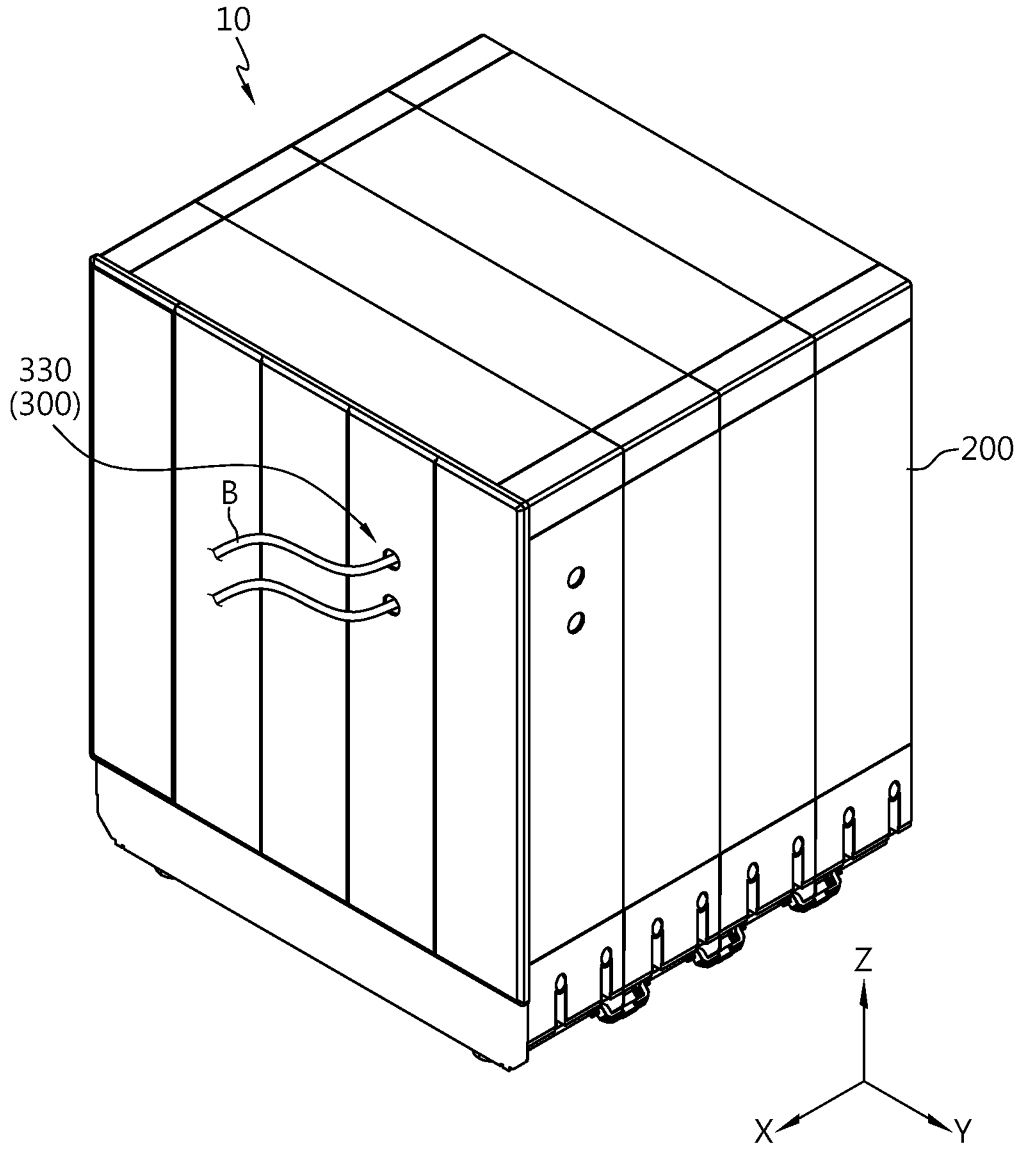
FIG. 3 is a diagram for explaining the connection between the battery pack of FIG. 1 and an electrical member of a second connection type.

FIG. 1 is a diagram for explaining a battery pack according to an embodiment of the present disclosure, FIG. 2 is a diagram for explaining the connection between the battery pack of FIG. 1 and an electrical member of a first connection type, and FIG. 3 is a diagram for explaining the connection between the battery pack of FIG. 1 and an electrical member of a second connection type.

Referring to FIGS. 1 to 3, a battery pack 10 may include a battery module 100, a pack case 200, and a connection guide unit 300.

The battery module 100 may include at least one battery cell 110. Here, each battery cell 110 may mean a secondary battery. A secondary battery may include an electrode assembly, an electrolyte, and a battery case. Moreover, the battery cell 110 included in the battery module 100 may be a pouch-type secondary battery. However, other types of secondary batteries, such as cylindrical batteries or prismatic batteries, may also be employed in the battery module 100 of the present disclosure.

The pack case 200 may accommodate the battery module 100. An accommodation space for accommodating the battery module 100 may be provided in the pack case 200. In addition, the accommodation space is connected to the battery module 100 and may accommodate components such as a control module for controlling or managing the battery pack 10 and various electrical components.

The connection guide unit 300 may be provided on at least one side of the pack case 200. The connection guide unit 300 is electrically connected to the control module, the battery module 100, or the like, and may be configured to be accessible to electrical members A and B of two or more connection types.

Here, the electrical members A and B of two or more connection types may be an electric field configuration required for installation, and may be, for example, a configuration for connecting an inverter or an inverter itself. That is, the connection guide unit 300 may be configured to guide the connection between the battery pack 10 and the inverter.

In this embodiment, through the connection guide unit 300, it is possible to guide electric connection of not only an electrical member of one connection type but also electrical members A and B of two or more connection types, so that during installation or later inspection of the battery pack 10, compatibility with electrical members such as various types of inverters can be remarkably improved just with one product.

Accordingly, the battery pack 10 according to this embodiment may remarkably improve compatibility and workability during installation or later inspection. In addition, since the battery pack 10 according to this embodiment is prepared to be compatible with electrical members A and B of two or more connection types, inconvenience during installation or inspection due to mismatch of connection type is minimized, and the addition of compatible components and the like is not required, so both work convenience and cost reduction can be satisfied.

Hereinafter, the connection guide unit 300 according to this embodiment will be described in more detail.

The connection guide unit 300 may include a first connection guider 310 and a second connection guider 330.

The first connection guider 310 may be provided to be accessible to the electrical member A of a first connection type. Here, the electrical member A of the first connection type may be an inverter applied in the US region or a component that guides connection with the inverter applied in the US region.

The second connection guider 330 may be connected to the electrical member B of a second connection type, which is different from the electrical member A of the first connection type. Here, the electrical member B of the second connection type may be an inverter applied in the Europe region or a component that guides connection with the inverter applied in the Europe region.

As such, in this embodiment, through the first connection guider 310 and the second connection guider 330, the battery pack 10 may be provided as a single product compatible with both the electrical members A and B of two connection types. For example, the battery pack 10 according to this embodiment may be a battery pack 10 that is compatible with both the US and EU regions through the first connection guider 310 and the second connection guider 330.

The first connection guider 310 and the second connection guider 330 may be provided on different sides of the pack case 200. Accordingly, in this embodiment, since the first connection guider 310 and the second connection guider 330 are provided on different sides of the pack case 200, when connecting through each connection guider 310 and 330, problems such as erroneous assembly of an operator or user can be reduced.

Specifically, the first connection guider 310 is provided on one side surface of the pack case 200, and the second connection guider 330 may be provided on another side surface of the pack case 200 adjacent to one side surface of the pack case 200.

In this embodiment, as the first connection guider 310 and the second connection guider 330 are placed on different sides close to each other in the pack case 200, when connecting the electrical members A and B of appropriate types, the operator or user may easily check the position of the connection guiders 310 and 330 more quickly with naked eye or the like, so work efficiency can be further increased during installation or connection work.

Therefore, in the battery pack 10 according to this embodiment, the convenience of connection work and device compatibility can be significantly improved during installation or subsequent inspection for connection between the electrical members A and B of various connection types just with one product.

Meanwhile, on each side of the pack case 200 where the first connection guider 310 and the second connection guider 330 are disposed, an identification mark capable of distinguishing the first connection guider 310 and the second connection guider 330 from each other may be provided. This is to prevent erroneous assembly during connection work by the operator or user.

Figure 4:
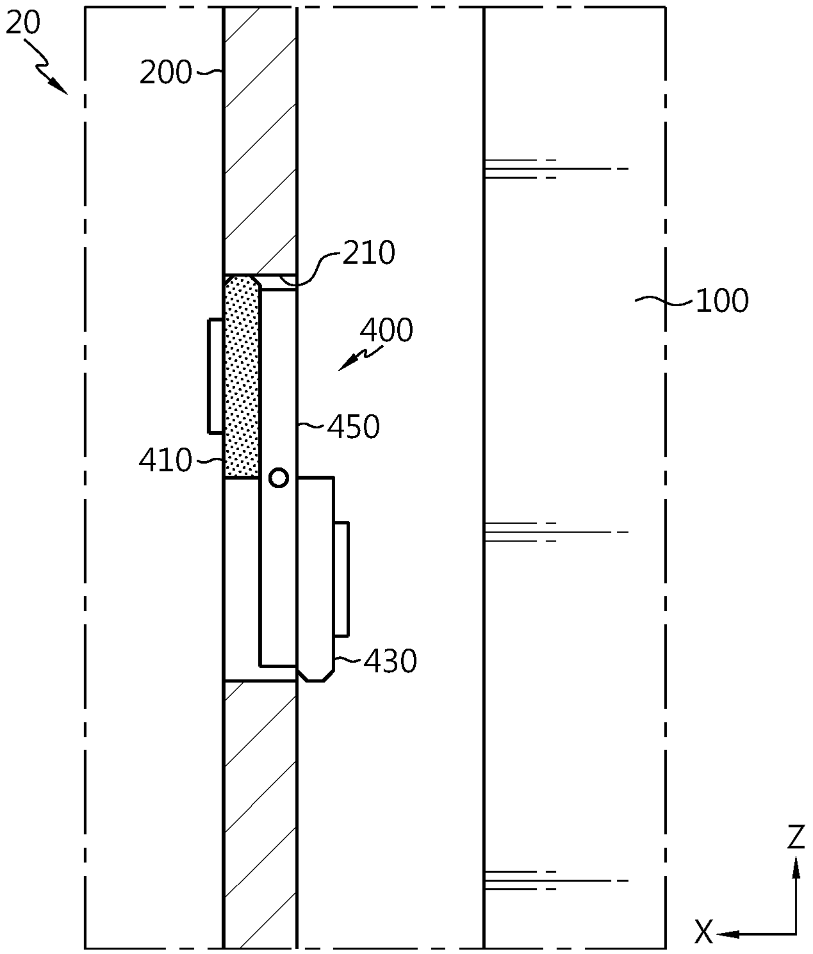
FIG. 4 is a diagram for explaining a battery pack according to another embodiment of the present disclosure.
Figure 5:
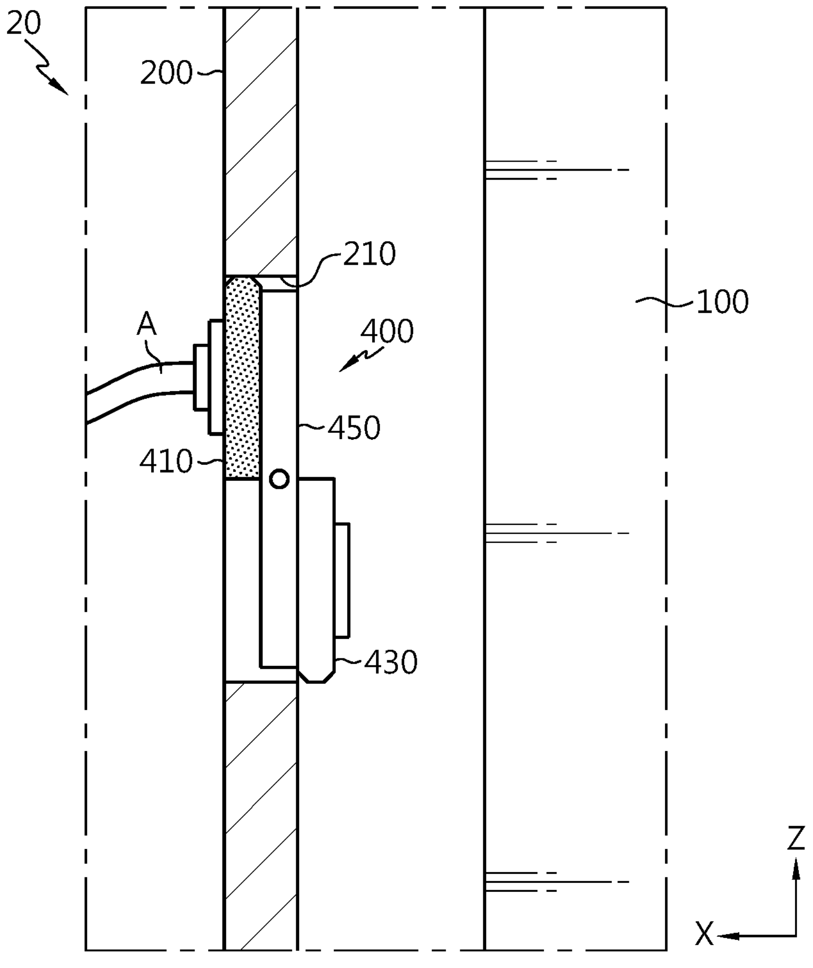
FIG. 5 is a diagram for explaining the connection between the battery pack of FIG. 4 and the electrical member of the first connection type.
Figure 6:
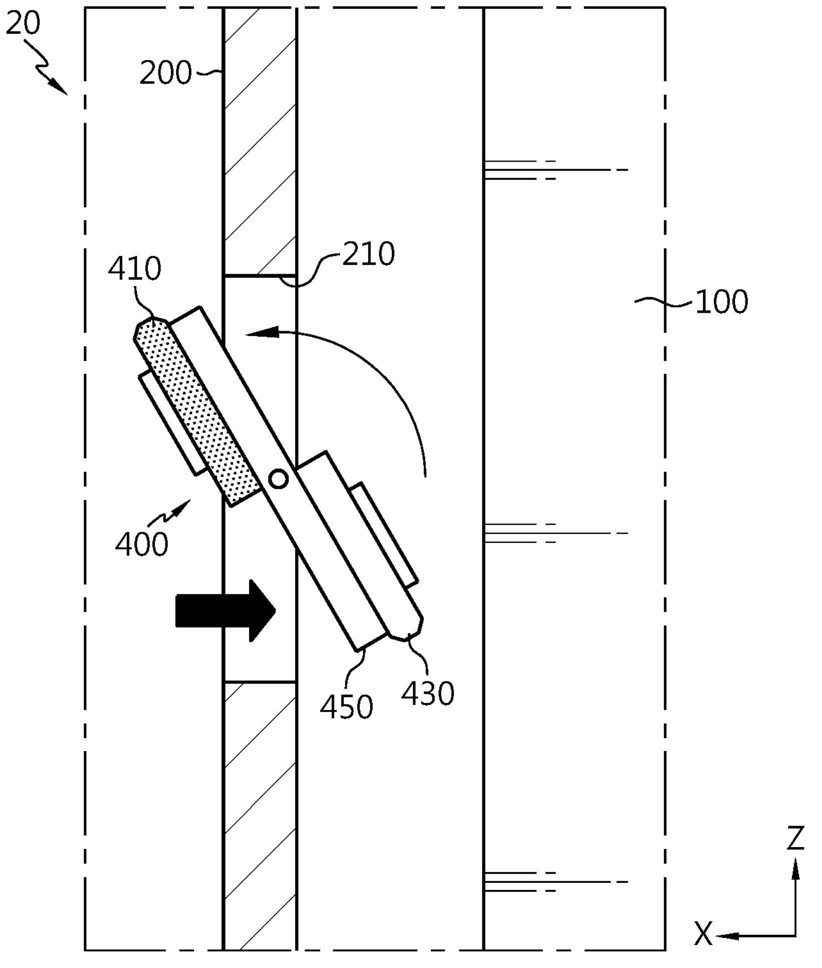
FIGS. 6 and 7 are diagrams for explaining the operation of a connection guide unit of the battery pack of FIG. 4.
Figure 7:
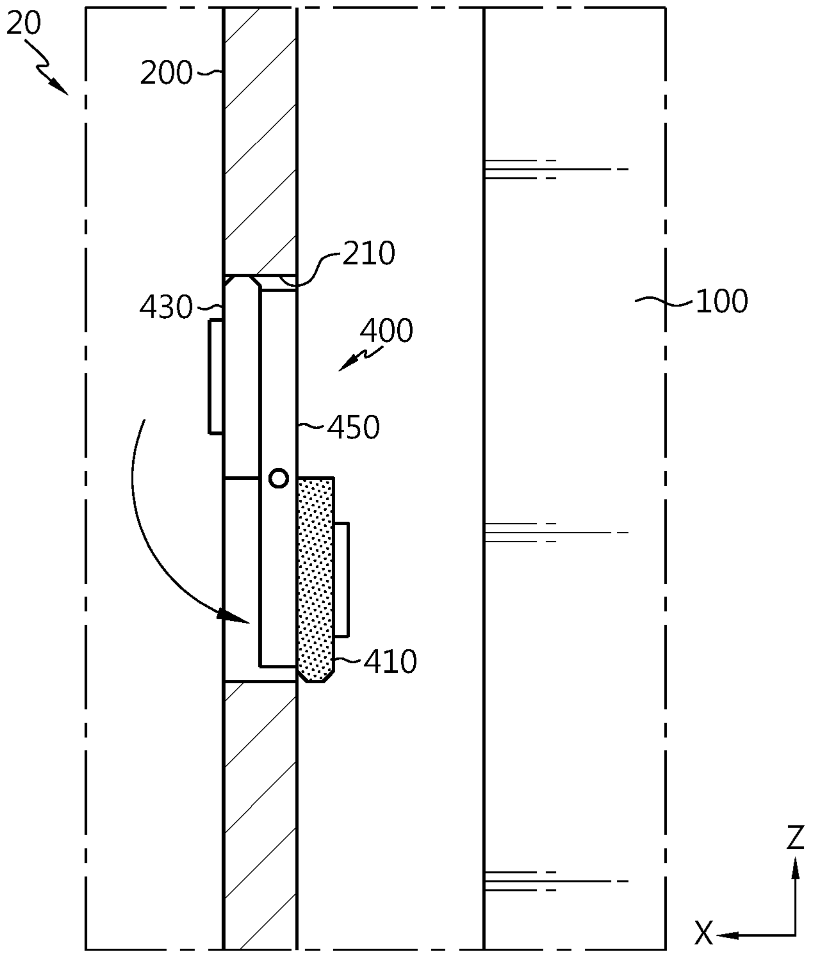
Figure 8:
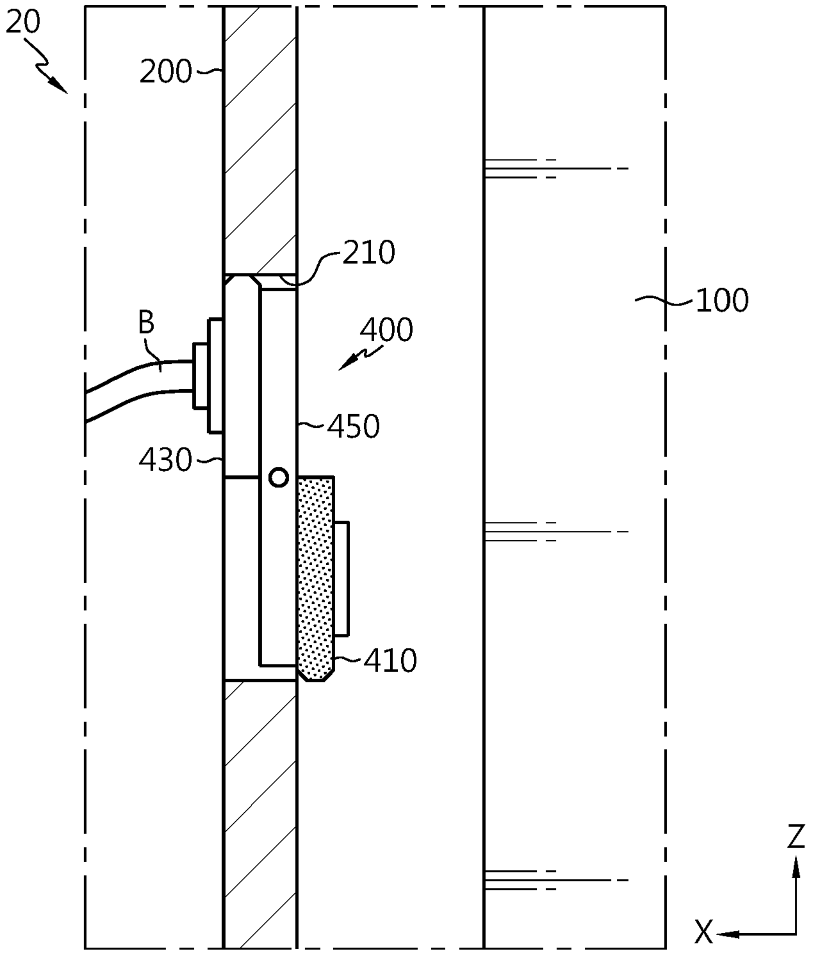
FIG. 8 is a diagram for explaining the connection between the battery pack of FIG. 4 and the electrical member of the second connection type.

FIG. 4 is a diagram for explaining a battery pack according to another embodiment of the present disclosure, FIG. 5 is a diagram for explaining the connection between the battery pack of FIG. 4 and the electrical member of the first connection type, FIGS. 6 and 7 are diagrams for explaining the operation of a connection guide unit of the battery pack of FIG. 4, and FIG. 8 is a diagram for explaining the connection between the battery pack of FIG. 4 and the electrical member of the second connection type.

Since the battery pack 20 according to this embodiment is similar to the battery pack of the previous embodiment, redundant description of components substantially the same as or similar to those of the previous embodiment will be omitted, and the following will focus on differences from the previous embodiment.

Referring to FIGS. 4 to 8, the battery pack 20 may include a battery module 100, a pack case 200, and a connection guide unit 400.

Since the battery module 100 is substantially the same as or similar to that of the previous embodiment, a redundant description thereof will be omitted.

The pack case 200 may include a guide unit mounting portion 210 on which a connection guide unit 400 to be described later is disposed.

The connection guide unit 400 may include a first connection guider 410 and a second connection guider 430.

At least one of the first connection guider 410 and the second connection guider 430 may be exposed to be accessible to the outside of the pack case 200 according to a user operation. Accordingly, in this embodiment, the first connection guider 410 or the second connection guider 430 may be exposed to the outside of the pack case 200 and accessed according to a connection type required by the user or worker.

The connection guide unit 400 may include a shaft portion 450.

The shaft portion 450 may be rotatably provided to the pack case 200. Specifically, the shaft portion 450 may be rotatably mounted to the guide unit mounting portion 210. The shaft portion 450 may be connected to the first connection guider 410 and the second connection guider 430.

In this embodiment, the worker or the like may rotate the shaft portion 450 through a user operation to guide a connection work through the first connection guider 410 and the second connection guider 430.

Specifically, the first connection guider 410 may be provided on one side of the shaft portion 450, and the second connection guider 430 may be provided on the other side of the shaft portion 450.

More specifically, the first connection guider 410 is provided on one side surface of the shaft portion 450, and the second connection guider 430 may be provided on another side surface of the shaft portion 450, which is opposite to the one side surface of the shaft portion 450.

The shaft portion 450 may expose the first connection guider 410 or the second connection guider 430 to the outside of the pack case 200 while being rotated according to the user operation.

Here, when the first connection guider 410 is exposed to the outside of the pack case 200, the second connection guider 430 may be disposed inside the pack case 200, and when the second connection guider 430 is exposed to the outside of the pack case 200, the first connection guider 410 may be disposed inside the pack case 200.

Accordingly, in this embodiment, according to the connection type of the electrical member A, B, only the connection guider 410, 430 connected to the necessary electrical member A, B may be selectively connected to the electrical member A, B of a connection type that is to be exposed to the outside of the pack case 200 and connected.

The shaft portion 450 may be mounted to the pack case 200 to be rotatable in any one of clockwise and counterclockwise directions. That is, the shaft portion 450 may be mounted to the guide unit mounting portion 210 to be rotatable clockwise or counterclockwise.

In this embodiment, the shaft portion 450 may be provided to rotate in a counterclockwise direction according to user pressure of the worker or user. Here, the shaft portion 450 may be pressed in a portion of one side surface of the shaft portion 450 where the first connection guider 410 and the second connection guider 430 are not disposed and a portion of another side surface of the shaft portion 450. For example, in FIG. 4, the portion may be a left (+X-axis direction) lower surface and a right (−X-axis direction) upper surface of the shaft portion 450 based on the rotation axis of the shaft portion.

Such rotation in one direction may be performed by pressing a portion of one side surface of the shaft portion 450 where the first connection guider 410 and the second connection guider 430 are not disposed and a portion of another side surface of the shaft portion 450.

This is to prevent a rotational motion from occurring when the portion of the shaft portion 450 where the first connection guider 410 and the second connection guider 430 are disposed is pressurized. In the first connection guider 410 and the second connection guider 430, a connection operation between the electrical member A of the first connection type and the electrical member B of the second connection type is performed, respectively. At this time, this is because, when pressing for connection is performed, the shaft portion 450 may rotate and interfere with the connection operation.

As such, in this embodiment, by a rotational motion through the shaft portion 450 of the connection guide unit 400, the first connection guider 410 or the second connection guider 430 may be exposed to the outside of the pack case 200 and selectively connected to the electrical member A, B of a desired connection type.

Meanwhile, the first connection guider 410 and the second connection guider 430 may be configured to have a form, shape, or color that can be distinguished from each other through the naked eyes of the user. Accordingly, in this embodiment, when the first connection guider 410 or the second connection guider 430 is connected to the electrical member A, B, it is possible to more effectively prevent the occurrence of erroneous assembly by the user or worker during the connection work.

Figure 9:
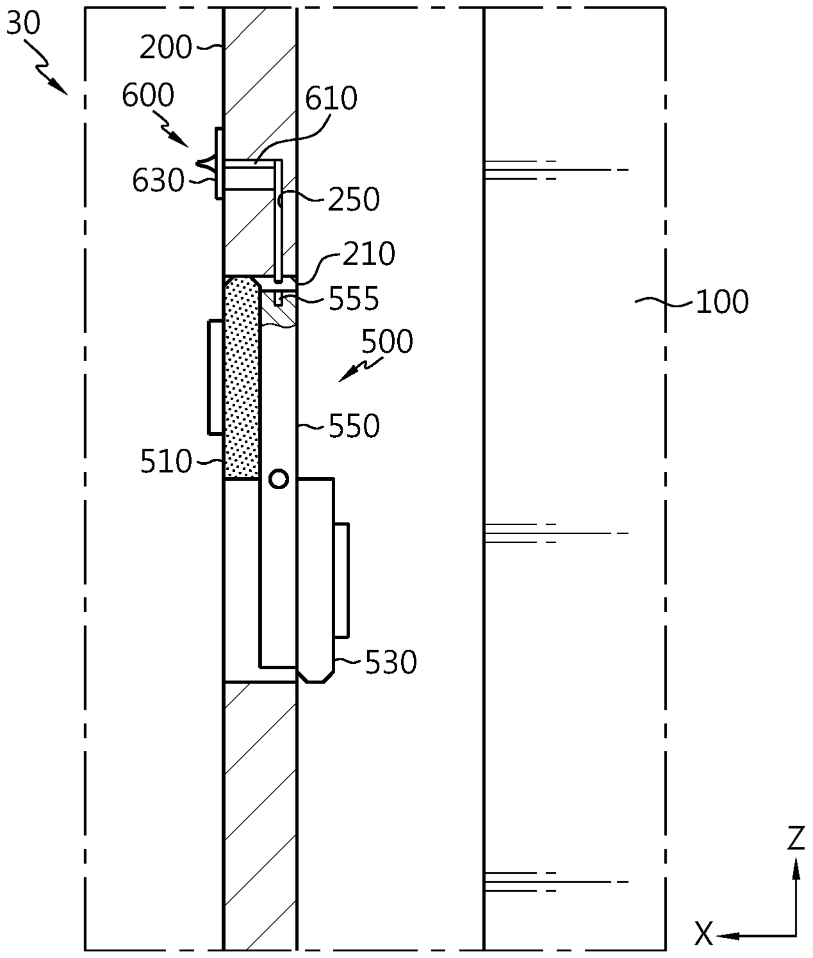
FIG. 9 is a diagram for explaining a battery pack according to still another embodiment of the present disclosure.
Figure 10:
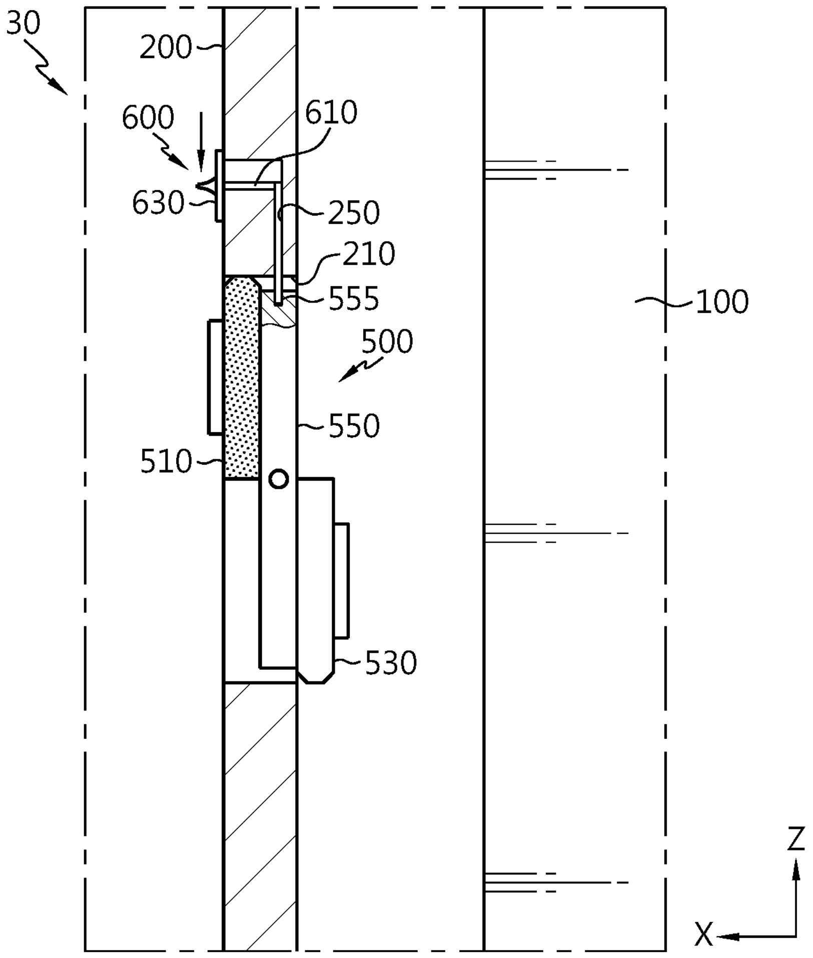
FIG. 10 is a diagram for explaining the operation of a fixing stopper of the battery pack of FIG. 9.

FIG. 9 is a diagram for explaining a battery pack according to still another embodiment of the present disclosure, and FIG. 10 is a diagram for explaining the operation of a fixing stopper of the battery pack of FIG. 9.

Since the battery pack 30 according to this embodiment is similar to the battery pack of the previous embodiment, redundant description of components substantially the same as or similar to those of the previous embodiment will be omitted, and the following will focus on differences from the previous embodiment.

Referring to FIGS. 9 and 10, the battery pack 30 may include a battery module 100, a pack case 200, and a connection guide unit 500.

Since the battery module 100 is substantially the same as or similar to that of the previous embodiment, a redundant description thereof will be omitted.

The pack case 200 may include a stopper groove 250. The stopper groove 250 may communicate with the guide unit mounting portion 210. A fixing stopper 600 to be described below may be slidably mounted to the stopper groove 250.

The connection guide unit 500 may include a first connection guider 510, a second connection guider 530, and a shaft portion 550.

Since the first connection guider 510 and the second connection guider 530 are similar to the first connection guider 410 and the second connection guider 430 of the previous embodiment, a redundant description thereof will be omitted.

A stopper insert 555 having a predetermined depth into which the fixing stopper 600 described later may be inserted may be formed in the shaft portion 550. The stopper insert 555 will be described later in more detail in related descriptions.

The battery pack 30 may include a fixing stopper 600.

The fixing stopper 600 is provided in the pack case 200 and may fix the shaft portion 550. The fixing stopper 600 may limit the movement of the shaft portion 550 to prevent shaking or the like of the shaft portion 550 during a connection operation of the first connection guider 510 or the second connection guider 530.

The fixing stopper 600 may be coupled to the shaft portion 550 or separated from the shaft portion 550 by sliding according to a user operation. Accordingly, when rotation of the shaft portion 550 is required according to the user operation, interference caused by the fixing stopper 600 may be prevented, and when fixing of the shaft portion 550 is required, movement of the shaft portion 550 may be restricted through the fixing stopper 600.

The fixing stopper 600 may include a stopper protrusion 610 and a stopper operation portion 630.

The stopper protrusion 610 may be provided in the stopper groove 250. The stopper protrusion 610 may be inserted into the stopper insert 555 of the shaft portion 550 or be released and separated from the stopper insert 555 while sliding in the vertical direction (Z-axis direction) along the stopper groove 250 according to the user operation.

The stopper operation portion 630 is connected to the stopper protrusion 610 and may be exposed to the outside of the pack case 200 to guide a user operation of the fixing stopper 600.

The operator or user may insert the stopper protrusion 610 into the stopper insert 555 of the shaft portion 550 or separate the stopper protrusion 610 from the stopper insert 555 by manipulating the stopper operation portion 630.

Meanwhile, in this embodiment, since the shaft portion 550 may be fixed through the fixing stopper 600, the shaft portion 550 may be provided to be rotatable in both clockwise and counterclockwise directions.

As such, in this embodiment, during the connecting operation of the first connection guider 510 or the second connection guider 530, through the fixing stopper 600, the accuracy of the connecting operation between each connection guider 510, 530 and the electrical members A, B may be further improved by fixing the shaft portion 550.

Figure 11:
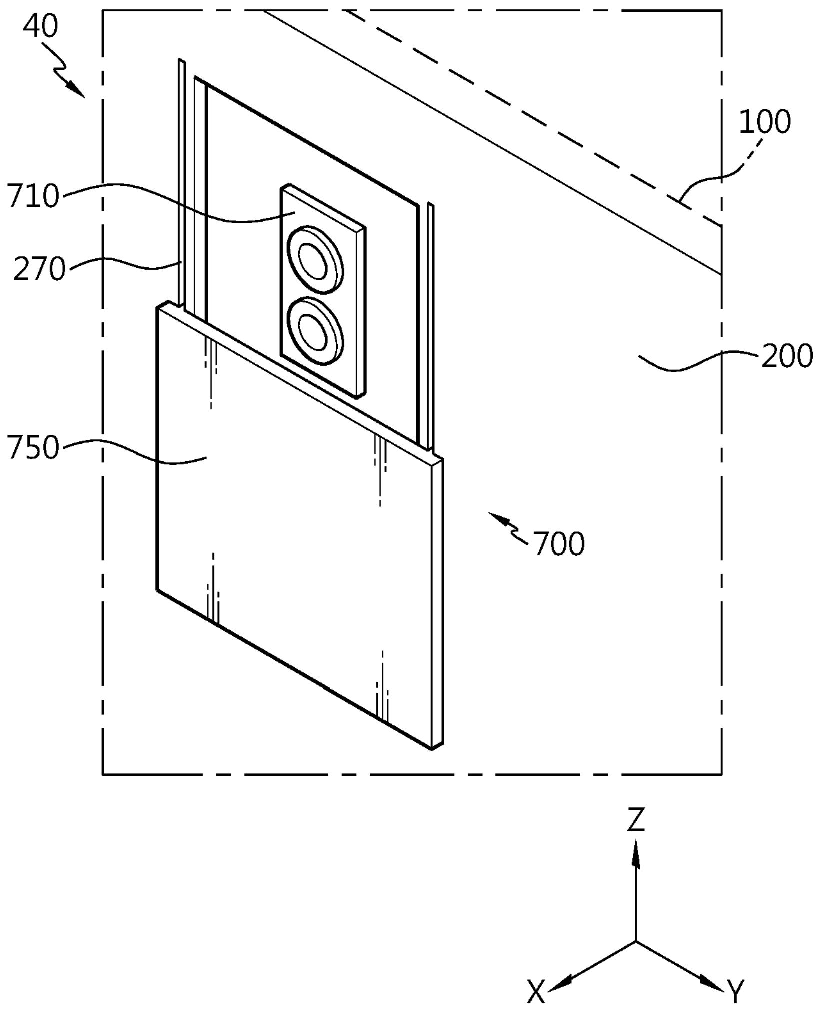
FIG. 11 is a diagram for explaining a battery pack according to still another embodiment of the present disclosure.
Figure 12:
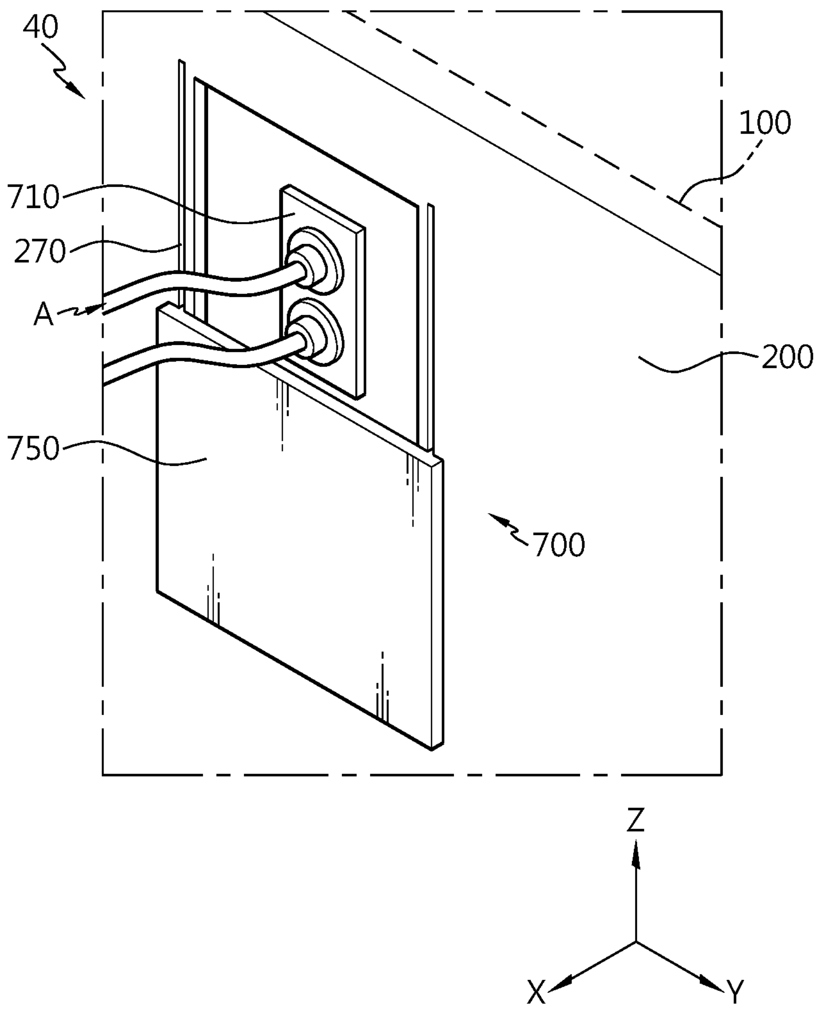
FIG. 12 is a diagram for explaining the connection between the battery pack of FIG. 11 and the electrical member of the first connection type.
Figure 13:
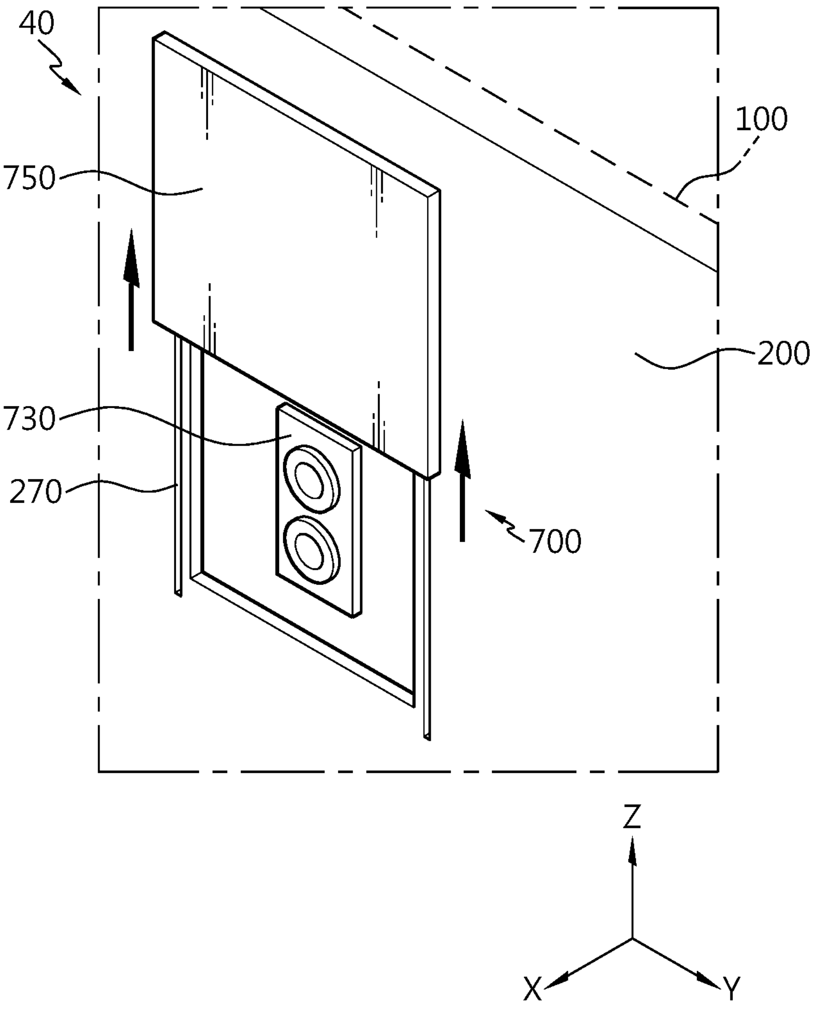
FIG. 13 is a diagram for explaining the operation of a connection guide unit of the battery pack of FIG. 11.
Figure 14:
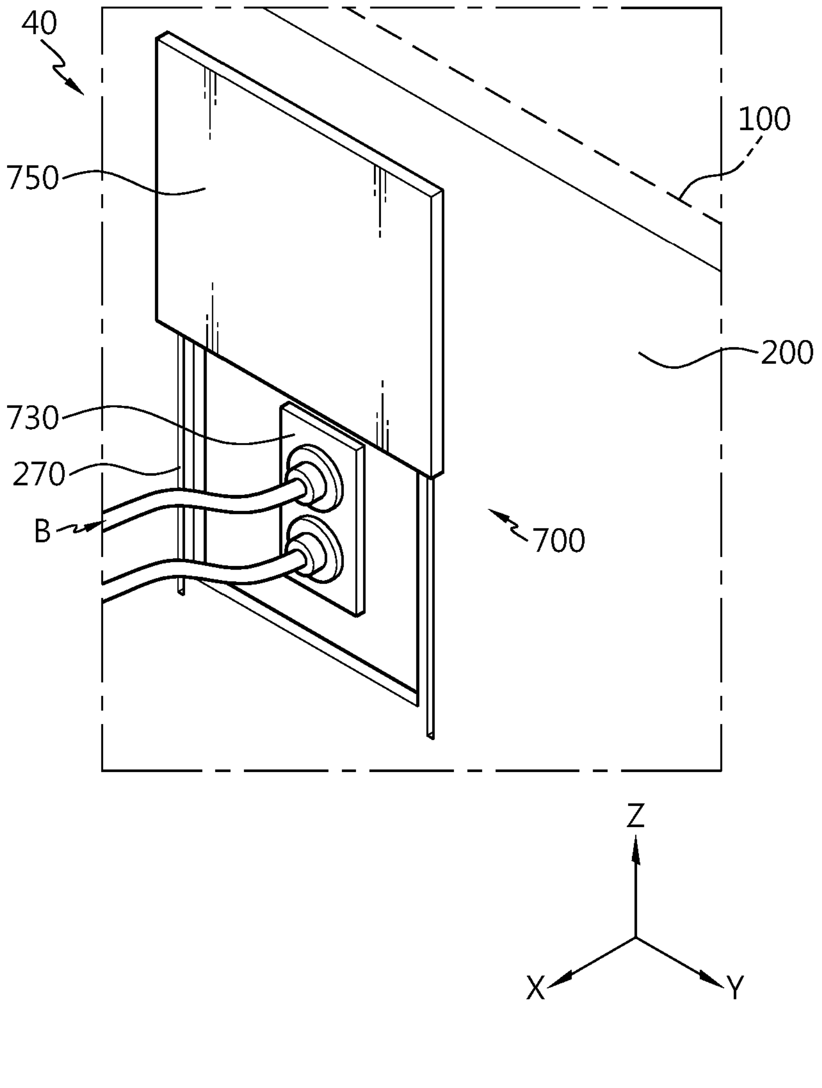
FIG. 14 is a diagram for explaining the connection between the battery pack of FIG. 11 and the electrical member of the second connection type.

FIG. 11 is a diagram for explaining a battery pack according to still another embodiment of the present disclosure, FIG. 12 is a diagram for explaining the connection between the battery pack of FIG. 11 and the electrical member of the first connection type, FIG. 13 is a diagram for explaining the operation of a connection guide unit of the battery pack of FIG. 11, and FIG. 14 is a diagram for explaining the connection between the battery pack of FIG. 11 and the electrical member of the second connection type.

Since the battery pack 40 according to this embodiment is similar to the battery pack of the previous embodiment, redundant description of components substantially the same as or similar to those of the previous embodiment will be omitted, and the following will focus on differences from the previous embodiment.

Referring to FIGS. 11 to 14, the battery pack 40 may include a battery module 100, a pack case 200, and a connection guide unit 700.

Since the battery module 100 is substantially the same as or similar to that of the previous embodiment, a redundant description thereof will be omitted.

The pack case 200 may include a sliding rail 270.

The sliding rail 270 is for guiding the sliding of the slider 750 of the connection guide unit 700 to be described later, and may be provided on one side of the pack case 200.

The connection guide unit 700 may include a first connection guider 710 and a second connection guider 730.

The first connection guider 710 may be provided on one side surface of the pack case 200. The second connection guider 730 may be provided on one side surface of the pack case 200 to be spaced apart from the first connection guider 710 by a predetermined distance. Specifically, the first connection guider 710 and the second connection guider 730 may be spaced apart from each other by a predetermined distance along the vertical direction (Z-axis direction) on one side surface of the pack case 200.

The connection guide unit 700 may include a slider 750.

The slider 750 may be slidably provided on the pack case 200. Specifically, the slider 750 may be slidable in the vertical direction (Z-axis direction) along the sliding rail 270.

The slider 750 may expose any one of the first connection guider 710 and the second connection guider 730 to the outside of the pack case 200 through the sliding.

Accordingly, in this embodiment, any one of the first connection guider 710 and the second connection guider 730 may be exposed and connected to the electrical member A, B of a connection type to be connected through sliding of the slider 750.

Specifically, the slider 750 may be configured to be slidable between a first position capable of exposing the first connection guider 710 and a second position capable of exposing the second connection guider 730.

Here the first position refers to a position at which the slider 750 covers the second connection guider 730 and a position disposed below the first connection guider 710, and the second position refers to a position at which the slider 750 covers the first connection guider 710 and a position disposed above the second connection guider 730.

As such, in this embodiment, the first connection guider 710 or the second connection guider 730 may be exposed to the outside of the pack case 200 through sliding of the slider 750 of the connection guide unit 700 and selectively connected with the electrical member A, B of a desired connection type.

An energy storage system according to an embodiment of the present disclosure includes at least one battery pack 10, 20, 30, 40 according to an embodiment of the present disclosure described above. In addition, the energy storage system according to an embodiment of the present disclosure may further include general components included in an energy storage system in addition to the battery pack 10, 20, 30, 40. In particular, the energy storage system according to an embodiment of the present disclosure may be a residential (building) energy storage system used to store energy in a house or building.

In addition, the energy storage system may include a plurality of battery packs 10, 20, 30, 40 an embodiment of the present disclosure, which are electrically connected to each other in order to have a large energy capacity. In addition, the energy storage system according to an embodiment of the present disclosure may further include various other components of energy storage systems known at the time of filing of this application. Moreover, the energy storage system may be used in various places or devices, such as a smart grid system or an electric charging station.

Also, a vehicle according to an embodiment of the present disclosure may include at least one battery pack 10, 20, 30, 40 according to an embodiment of the present disclosure. In addition, the vehicle according to an embodiment of the present disclosure may further include various other components included in a vehicle in addition to the battery pack. For example, the vehicle according to an embodiment of the present disclosure may further include a vehicle body, a motor, and a control device such as an electronic control unit (ECU), in addition to the battery pack 10, 20, 30, 40 according to an embodiment of the present disclosure.

According to various embodiments as described above, there may be provided a battery pack 10, 20, 30, 40 that may increase the installation compatibility, and an energy storage system including the same.

In addition, according to various embodiments as described above, there may be provided a battery pack 10, 20, 30, 40 that may increase the installation workability, and an energy storage system including the same.

While the preferred embodiments of the present disclosure have been shown and described, the present disclosure is not limited to the specific embodiments described above, various modifications may be made by one of ordinary skill in the art to which the present disclosure pertains without departing from the gist of the present disclosure as defined by the claims, and these modifications should not be individually understood from the technical feature or prospect of the present disclosure.

What is claimed is:

1. A battery pack comprising:

a battery module having at least one battery cell;

a pack case configured to accommodate the battery module; and a connection guide provided on at least one side of the pack case and configured to be accessible to electrical members of two or more connection types, wherein the connection guide includes a first connection guider provided to be accessible to an electrical member of a first connection type and a second connection guider provided to be accessible to an electrical member of a second connection type that is different from the electrical member of the first connection type, wherein at least one of the first connection guider and the second connection guider is exposed to be accessible to an outside of the pack case according to a user operation, wherein the connection guide includes a shaft portion rotatably provided in the pack case and connected to the first connection guider and the second connection guider, and wherein the shaft portion rotates according to the user operation such that, when the first connection guider is exposed to the outside of the pack case, the second connection guider is disposed inside the pack case, and when the second connection guider is exposed to the outside of the pack case, the first connection guider is disposed inside the pack case.

2. The battery pack according to claim 1, wherein the first connection guider is provided on a first side of the shaft portion, and wherein the second connection guider is provided on a second side of the shaft portion.

3. The battery pack according to claim 1, wherein the shaft portion is mounted to the pack case to be rotatable in any one of clockwise and counterclockwise directions.

4. The battery pack according to claim 1, further comprising a fixing stopper provided to the pack case to fix the shaft portion.

5. The battery pack according to claim 4, wherein the fixing stopper is coupled to the shaft portion or separated from the shaft portion by sliding according to the user operation.

6. The battery pack according to claim 1, wherein the connection guide is configured to guide the connection between the battery pack and an inverter.

7. An energy storage system, comprising the battery pack according to claim 1.

* * * * *